United States Patent [19]

McKeon

[11] Patent Number: 4,949,745
[45] Date of Patent: Aug. 21, 1990

[54] CLEAN AIR CONNECTOR

[75] Inventor: John J. McKeon, Hamden, Conn.

[73] Assignee: Air-Lock, Incorporated, Milford, Conn.

[21] Appl. No.: 290,691

[22] Filed: Dec. 27, 1988

[51] Int. Cl.⁵ .............................................. F16L 37/28
[52] U.S. Cl. ..................................... 137/15; 137/614; 137/614.03
[58] Field of Search ...................... 137/614.03, 614, 15

[56] References Cited

U.S. PATENT DOCUMENTS

| | | | |
|---|---|---|---|
| 2,471,237 | 5/1949 | Pasturczak | 137/614.03 |
| 2,505,093 | 4/1950 | Brock | 137/614.03 |
| 2,735,696 | 2/1956 | Omon et al. | 137/614.04 |
| 2,753,195 | 7/1956 | Palmer | 137/614.03 |
| 2,837,352 | 6/1958 | Wurzburger | 137/614.03 |
| 2,854,258 | 9/1958 | Hickey et al. | 137/614.04 |
| 2,931,668 | 4/1960 | Baley | 137/614.04 |
| 3,348,575 | 10/1967 | Simak | 137/614.05 |
| 3,550,624 | 12/1970 | Johnson | 137/614 |
| 3,613,726 | 10/1971 | Torres | 137/614.03 |
| 3,777,771 | 12/1973 | De Visscher | 137/614 |
| 4,674,535 | 6/1987 | de Menibus | 137/614.03 |

OTHER PUBLICATIONS

Aeroquip's 1974 Catalog 240 at pp. 148-149, 159, and 165.

Primary Examiner—A. Michael Chambers
Attorney, Agent, or Firm—Maurice M. Klee

[57] ABSTRACT

A connector (10) for use in a contaminated environment is provided. The connector includes first and second couplers (13, 14) which are coupled together to produce a fluid path (148) through the connector. The outer boundaries of the fluid path define a fluid path envelope. The surfaces (126, 128) which could be contaminated and which lie within the fluid path envelope are mated against one another and then captured between a pair of O-rings (46, 122). Parts of these surfaces, as well as other surfaces (130, 132) lying outside the fluid path envelope, are flushed with fluid (142, 144) as the connector is coupled to further reduce contamination. O-rings are also used to clean contamination from parts of some of the surfaces. As a result of these contamination control procedures, the connector can be assembled in a contaminated environment without introducing contamination into the fluid stream passing through the connector.

21 Claims, 4 Drawing Sheets

CLEAN AIR CONNECTOR

BACKGROUND OF THE INVENTION

1. Field of the Invention

This invention relates to connectors or couplings for joining together the ends of two hoses, tubes or the like. More particularly, the invention relates to a connector which (1) is of the quick connect/disconnect type, (2) can be used as part of a system for supplying air to a person in a contaminated environment, and (3) prevents contaminants in the environment from entering into the air supply as the coupling between the hoses is formed.

2. Description of the Prior Art

Clean air supplies are needed by persons working in contaminated environments as well as by military personnel in situations where biological or chemical weapons are employed. Some contaminants are so toxic that even the introduction of minute amounts of the contaminant into a person's air supply can be debilitating or lethal.

Couplings between air supply hoses often need to be made within a contaminated environment. Under these conditions, contaminants on the surfaces of the connector can be introduced into the air stream as the coupling is formed. Preventing such introduction is a difficult problem, and is the specific problem to which the present invention is addressed.

Various quick disconnect hose couplings have been produced commercially. See, for example, Aeroquip's 1974 Catalog 240 at pages 148–149, 159, and 165. The patent literature also discloses a wide variety of coupling constructions. See, for example, U.S. Pat. Nos. 2,735,696 (Omon), 2,854,258 (Hickey), 2,931,668 (Baley), 3,348,575 (Simak), 3,550,624 (Johnson), and 3,777,771 (De Visscher).

In particular, the De Visscher patent discloses an air connector for use underwater in which water is flushed out of the connector as the connector is assembled. The Johnson patent also discloses a flushing system. In this case, the connector is used with hydraulic fluid and the flushing occurs through the movement of poppet 40 which allows hydraulic fluid to pass over the mating surfaces of the connector.

The Omon, Hickey, Baley, and Simak patents disclose the use of poppet valves in hose connectors. In particular, the Baley patent shows the use of a bleed port 90 to relieve pressure as the connector is disassembled, while the Simak patent shows a connector with two poppet valves in which hydraulic pressure is used to open one of the valves.

Significantly, none of these prior art connectors are suitable for use in a contaminated environment where the introduction of even small amounts of the contaminant into an air stream cannot be tolerated. In particular, none of these prior art connectors prevent contaminants on the surface of the connector from being introduced into the air supply.

SUMMARY OF THE INVENTION

In view of the foregoing state of the art, it is an object of the present invention to provide an improved connector which can be assembled in a contaminated environment without introducing contamination into the fluid flowing through the connector. More particularly, it is an object of the invention to control the contamination located within the connector so as to minimize the probability that such contamination will be introduced into the fluid flowing through the connector.

To achieve the foregoing and other objects, the invention provides a connector having first and second couplers. When engaged with each other, the couplers form a fluid path through the connector. The outer boundaries of the fluid path define a fluid path envelope, and each of the couplers includes at least one contaminable surface which (a) is exposed to the surrounding environment when the connector is uncoupled and (b) lies within the fluid path envelope when the connector is in its coupled state. In accordance with the invention, these surfaces are physically isolated from the fluid path when the connector is in its coupled state. As discussed in detail below, in the preferred embodiments of the invention, this isolation is achieved by mating the surfaces against one another and by capturing the surfaces between O-rings.

In other preferred embodiments, parts of the contaminated surfaces lying within the fluid path envelope, as well as other surfaces lying within the sealed portion of the connector but outside of the envelope, are flushed with fluid as the connector is coupled to further reduce contamination. In addition, the O-rings are also used to clean contamination from parts of some of the surfaces.

The accompanying drawings, which are incorporated in and constitute part of the specification, illustrate the preferred embodiments of the invention, and together with the description, serve to explain the principles of the invention.

DESCRIPTION OF THE PREFERRED EMBODIMENTS

Figure 1:
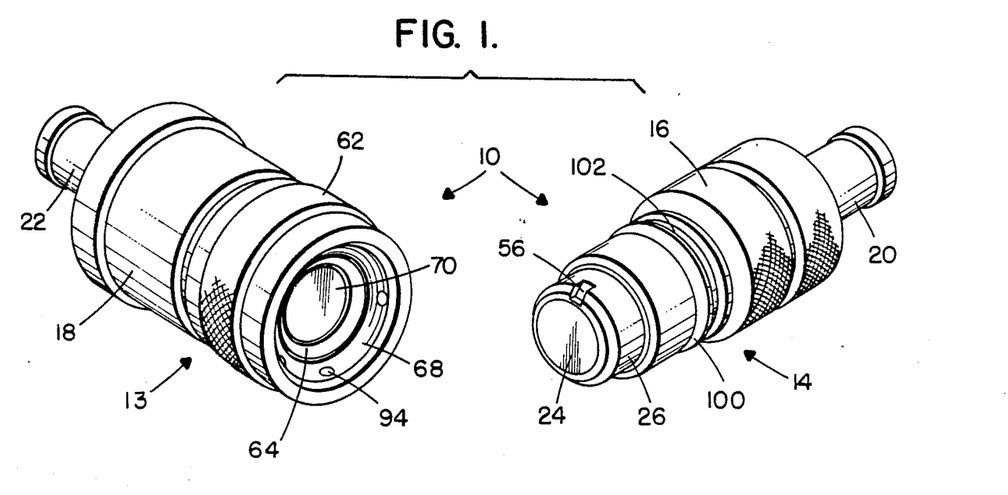
FIG. 1 is a perspective view of the two subassemblies (couplers) which make up the connector.

With reference now to the drawings, wherein like reference characters designate like or corresponding parts throughout the several views, there is shown in FIG. 1 a perspective view of a connector 10 constructed in accordance with the present invention. The connector consists of two subassemblies 13 and 14, with the direction of fluid flow in the assembled connector being from subassembly 13 to subassembly 14. In the description which follows, components and parts of components are described as being "upstream" or "downstream", where upstream refers to being closer to the source of the fluid flow, i.e., to the left in the figures, and downstream refers to being farther from the source of the fluid flow, i.e., to the right in the figures.

Figure 2:
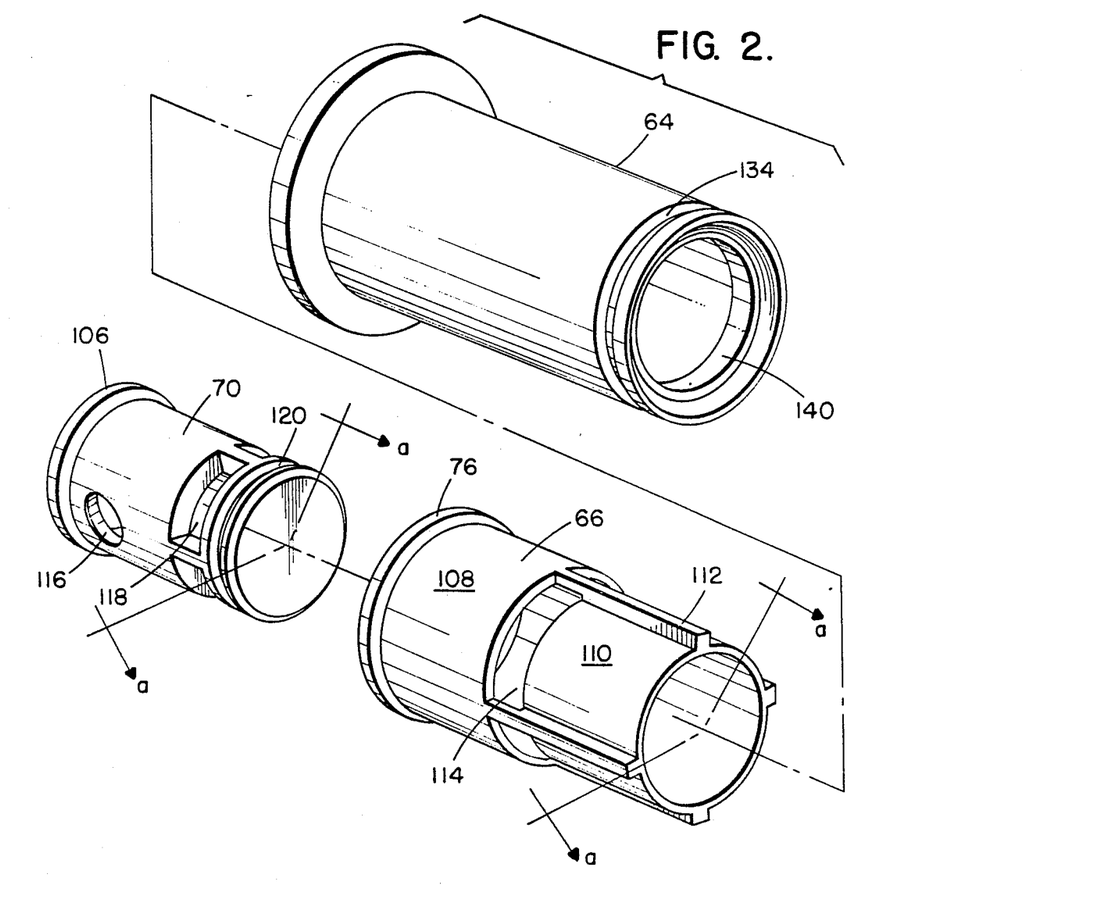
FIG. 2 is a perspective view of certain internal components of the left hand (upstream) subassembly of FIG. 1.
Figures 3, 4:
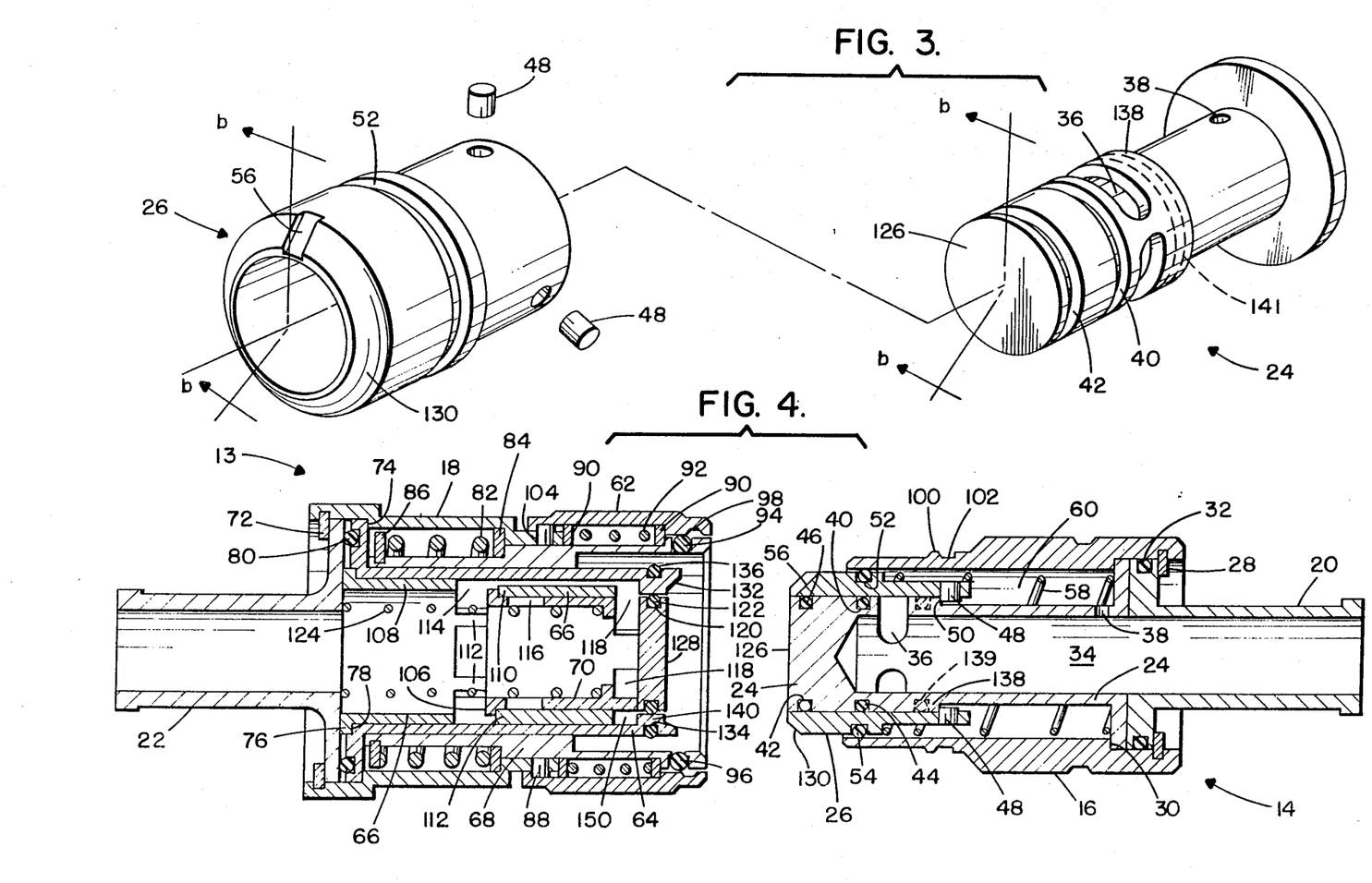
FIG. 3 is a perspective view of certain internal components of the right hand (downstream) subassembly of FIG. 1.
FIGS. 4 through 8 are cross-sectional views of the subassemblies illustrating, respectively, the uncoupled state of the connector, the first purging of the connector, the second purging of the connector, the sealing of the connector, and the configuration of the connector when fully coupled. The cross sections shown in these figures are taken along lines a—a and b—b in FIGS. 2 and 3, respectively.

As can be seen in FIGS. 2 and 4, subassembly 13 is composed of hose end 22, outer housing 18, retracting sleeve 62, ball housing 68, inner housing 64, liner 66, and shuttle valve 70. Hose end 22 is designed for connection to a hose, tube, or other fluid-carrying conduit. Hose end 22, outer housing 18, and inner housing 64 are held together in a fixed relation to one another by means of snap ring 72 and shoulder 74 formed in the inner wall of outer housing 18. Liner 66 is also held in a fixed relation to these three components by means of collar 76 which is received in groove 78 formed in the upstream end of inner housing 64. O-ring 80 forms a stationary seal between hose end 22 and inner housing 64. Ball housing 68 is held in a fixed relation to outer housing 18 and inner housing 64 by means of spring 82 which acts against washers 84 and 86.

Retracting sleeve 62 is held in a slidable relation to ball housing 68 by means of washers 90, spring 92, and pins 88 which pass through holes 104 in outer housing 18. Balls 94 are held in recesses 96 formed in ball housing 68 (e.g., six equally spaced recesses). These balls can move into groove 98 in retracting sleeve 62 when that sleeve is moved upstream relative to outer housing 18. Movement of balls 94 into groove 98 allows protruding ring 100 on the outside surface of subassembly 14's outer housing 16 to move past balls 94 as connector 10 is assembled and disassembled (see discussion below). Accordingly, retracting sleeve 62 must be moved to its upstream position against the force of spring 92 to assemble or disassemble connector 10.

Liner 66 includes an upstream cylindrical section 108, whose outer surface has a diameter which matches that of the inner surface of inner housing 64, and a downstream cylindrical section 110, whose outer surface has a smaller diameter than that of the inner surface of inner housing 64 so as to create a fluid conducting passage between the downstream section and the inner housing (see FIG. 2). Ribs 112 connect the cylindrical sections to one another and also position the downstream cylindrical section within inner housing 64. Cylindrical sections 108 and 110 are longitudinally spaced from one another to form ports 114 through which fluid can pass from the bore of the liner to the fluid conducting passage between downstream section 110 and inner housing 64.

Inner housing 64 includes groove 134 for receiving O-ring 136. As discussed below, subassemblies 13 and 14 are sealed together in the assembled connector by means of O-ring 136 engaging the inner surface of subassembly 14's outer housing 16.

Shuttle valve 70 includes a closed downstream end, an open upstream end, and apertures 116 and ports 118 which carry fluid through the wall of the valve. The valve also includes a collar 106 at its upstream end and a groove 120 for receiving O-ring 122 at its downstream end. Shuttle valve 70 is slidably received in liner 66 and can move from a fully downstream position in which collar 106 is in engagement with downstream section 110 of liner 66 to a fully upstream position in which collar 106 is in engagement with hose end 22. Spring 124 biases valve 70 into its fully downstream position. In this position, O-ring 122 forms a seal between the shuttle valve and inner housing 64. Accordingly, when connector 10 is uncoupled, subassembly 13 is in a fully-sealed condition by means of O-rings 122 and 80, and thus fluid, e.g., clean air, is not lost to the environment and contaminants cannot enter the subassembly when the connector is uncoupled.

As can be seen in FIGS. 3 and 4, subassembly 14 is composed of hose end 20, outer housing 16, inner housing 24, and shuttle valve 26. As with hose end 22, hose end 20 is designed for connection to a hose, tube, or other fluid-carrying conduit. Hose end 20, outer housing 16, and inner housing 24 are held together in a fixed relation to one another by means of snap ring 28 and shoulder 30 formed in the inner wall of outer housing 16. O-ring 32 forms a stationary seal between hose end 20 and outer housing 16.

Inner housing 24 includes open bore 34 and ports 36 which carry fluid through the wall of the housing. The upstream portion of housing 24 includes grooves 40 and 42 for receiving O-rings 44 and 46. As shown in FIG. 4, shuttle valve 26 is slidably mounted on the upstream portion of housing 24. Upstream motion of the shuttle valve is limited by pins 48 which engage shoulder 50 formed in the outer surface of the inner housing. O-rings 44 and 46 form a slidable seal between the outer surface of the inner housing and the inner surface of the shuttle valve.

Shuttle valve 26 includes groove 52 for receiving O-ring 54. O-ring 54 forms a slidable seal between the outer surface of shuttle valve 26 and the inner surface of outer housing 16. Shuttle valve 26 also includes channel 56 which is used to purge contaminated surfaces of subassemblies 13 and 14 as connector 10 is assembled (see discussion below). Shuttle valve 26 is biased towards the upstream portion of inner housing 24 by spring 58 and is moved downstream by overcoming the force of that spring. Inner housing 24 includes aperture 38 to vent chamber 60 as the shuttle valve moves relative to the inner and outer housings.

As can be seen in FIG. 4, when connector 10 is uncoupled, subassembly 14 is in a sealed condition, with O-rings 44 and 46 providing a seal between inner housing 24 and shuttle valve 26, O-ring 54 providing a seal between outer housing 16 and shuttle valve 26, and O-ring 32 providing a seal between outer housing 16 and hose end 20. In this way, contaminants in the surrounding environment cannot enter subassembly 14 when connector 10 is in its uncoupled state. This is an important feature of the present invention since subassembly 14 will typically be connected to a conduit leading to a face mask or other breathing device, and it is important to prevent the user of such a device from sucking contaminants into his air supply system through subassembly 14 when connector 10 is uncoupled.

As discussed above, the connector of the present invention is designed to be used in contaminated environments. The surfaces which can become contaminated and can then introduce such contamination into the fluid flowing through the connector are identified by the reference numbers 126 through 132 in FIG. 4. Specifically, 126 is the portion of the outer surface of inner housing 24 lying upstream of O-ring 46 including the front face of the inner housing, 128 is the portion of the outer surface of shuttle valve 70 lying downstream of O-ring 122 including the front face of the shuttle valve, 130 is the surface of shuttle valve 26 between O-rings 46 and 54, and 132 is the surface of inner housing 64 between O-rings 122 and 136. Of course, other surfaces of subassemblies 13 and 14 can become contaminated, however these surfaces are outside the sealed portion of the assembled connector (see FIG. 8) and thus any contamination on these surfaces is isolated from the fluid flowing through the connector.

Figure 8:
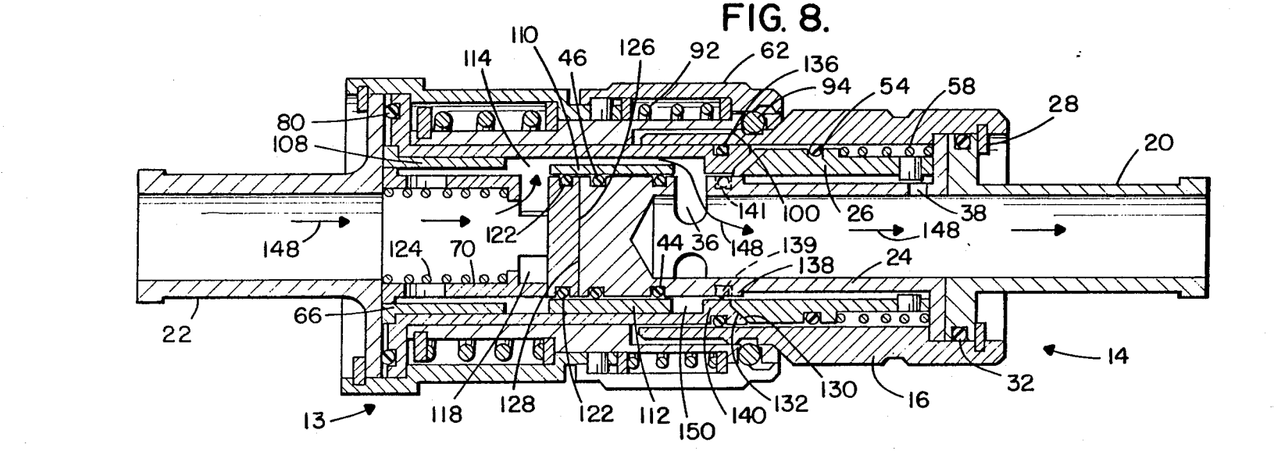

As shown in FIG. 8, the surfaces 126 through 132 fall into two groups in the assembled connector: (1) the surfaces, i.e., surfaces 126 and 128, which lie within the envelope of the fluid flowing through the connector, i.e., within the envelope of the fluid path through the connector, and (2) the surfaces, i.e., surfaces 130 and 132, which are within the sealed portion of the connector but which lie outside of the envelope of the fluid path. In accordance with the preferred embodiments of the invention, the contamination on these two groups of surfaces is handled differently.

The more critical contamination is that on inboard surfaces 126 and 128 since these surfaces are within the flowing fluid stream and thus any contamination which escapes from these surfaces will be entrained into the stream and swept out of the connector to the user, e.g., the contaminants will become part of the user's air supply. Accordingly, as shown in FIG. 8, the front faces of these surfaces are mated against one another to physically capture the contamination between the mating surfaces, and the entire surfaces are isolated from the fluid stream by means of O-rings 46 and 122. By this combination of physical capture and O-ring isolation, essentially complete protection from contamination of the flowing fluid stream is achieved.

Surfaces 130 and 132 lie within the sealed portion of the assembled connector, i.e., within the internal volume of the connector defined by O-rings 32, 54, 80 and 136 (see FIG. 8), but outside the envelope of the flowing fluid. Accordingly, the chances of contamination entering the fluid stream from these surfaces is less than that for surfaces 126 and 128. As a result, O-ring isolation has been found not to be necessary for these surfaces. Rather, physical mating of portions of the surfaces in combination with cleaning of other portions of the surfaces during assembly of the connector have proved sufficient to essentially eliminate the passage of contamination into the fluid stream from these surfaces. Of course, if desired, O-ring isolation could also be used for these outboard surfaces by, for example, including an O-ring in body portion 138 of inner housing 24 for engagement with body portion 140 of inner housing 64 in the assembled connector. This optional O-ring is shown dotted in the figures and is identified by the reference number 139. The optional groove in body portion 138 for receiving O-ring 139 is also shown dotted and is identified by the reference number 141.

As described in more detail below, two types of cleaning are used in connection with surfaces 130 and 132. First, as the connector is assembled, fluid from subassembly 13 is passed over certain portions of these surfaces and out into the surrounding environment. Second, O-rings are slid over parts of the contaminated surfaces to physically wipe those surfaces clean. By means of these two approaches, contamination is either physically removed from the connector or isolated at points inside the connector which are remote from the flowing fluid stream.

The assembly of connector 10 and the operation of the foregoing contamination control systems is illustrated in FIGS. 5–8. In these figures, subassembly 13 is held stationary and subassembly 14 is moved upstream, i.e., to the left, relative to subassembly 13. Of course, in actual use, either or both of subassemblies 13 and 14 can be moved to couple the connector.

Figure 5:
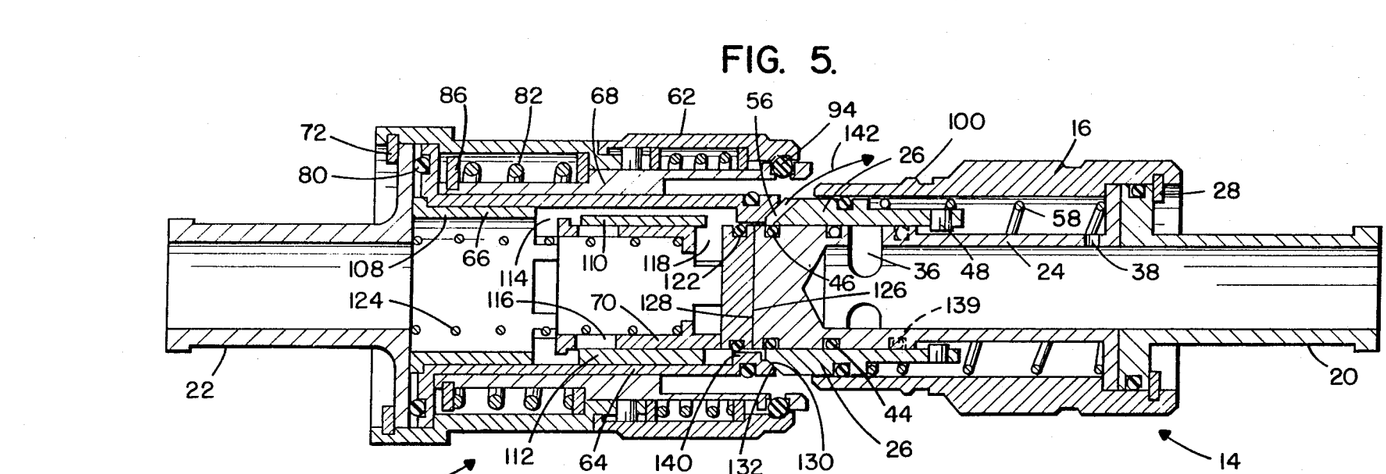

FIG. 5 shows the configuration of the subassemblies after initial mating. As shown in this figure, the mating portions of surfaces 126 and 128, as well as of surfaces 130 and 132, have come into contact to physically capture the contamination present on the mating portions of these surfaces. Although the surfaces are in contact, some motion between the surfaces which can release contamination, e.g., rocking of the surfaces against one another, can still take place. For this reason, as well as for other reasons, the connector is purged as the assembly process proceeds to remove any released contamination (see discussion below). Also, the fluid which is to be carried by the connector, e.g., clean air, is not allowed to pass into subassembly 14 and to the user until the very end of the assembly process (see FIGS. 7 and 8).

In FIG. 5, shuttle valve 26 has moved downstream relative to inner housing 24, and shuttle valve 70 has moved upstream relative to liner 66. The movements of the shuttle valves are equal because each valve is in contact with a fixed component of the opposite subassembly.

FIG. 5 shows the configuration of the connector at the beginning of the initial purge of the mating surfaces of the connector. O-ring 122 has just released from body portion 140 of inner housing 64 and O-ring 46 has not yet come into contact with body portion 140. Accordingly, fluid can pass from subassembly 13, over the non-mating portions of surfaces 126 through 132, and out of the connector through purge channel 56. (Arrow 142 indicates this purging fluid in FIG. 5.) In this process, the non-mating portions of surfaces 126 through 132 are cleaned, and any contamination released from the mating portions of these surfaces is swept out of the connector. The initial purge ends when O-ring 46 engages body portion 140. For the embodiment shown, this first purge is of a relatively short duration, since the difference between the length of body portion 140 and the spacing between O-rings 122 and 46 is small.

During the initial purge, purging fluid passes through subassembly 13 by means of the bore of rearward cylindrical section 108 of liner 66, the bore of shuttle valve 70, and the shuttle valve's ports 118. Fluid can also pass through ports 114 of liner 66 and around the outside of the liner's forward cylindrical section 110. Subassembly 14 is sealed during this initial purge, as well as during the second purge of the assembly (see discussion below), through the engagement of O-ring 44 with the inner surface of shuttle valve 26. It should be noted that the connector will also work successfully without the use of an initial purge.

In the transition from FIGS. 4 to 5, some wiping of the contaminated surfaces takes place. Specifically, O-ring 46 rides over the portion of surface 130 which lies on the inside of shuttle valve 26, thereby picking up contamination from this portion of surface 130.

FIG. 5 shows retracting sleeve 62 in its upstream position. The user of connector 10 must move this sleeve to this position as part of the assembly process. As discussed above, the sleeve needs to be in its retracted position to allow protruding ring 100 on outer housing 16 to move past balls 94 carried by ball housing 68. Although shown retracted in FIGS. 5 through 7, sleeve 62 does not have to be moved to this position until balls 94 and ring 100 actually come into contact, i.e., until the transition between FIGS. 7 and 8.

Figure 6:
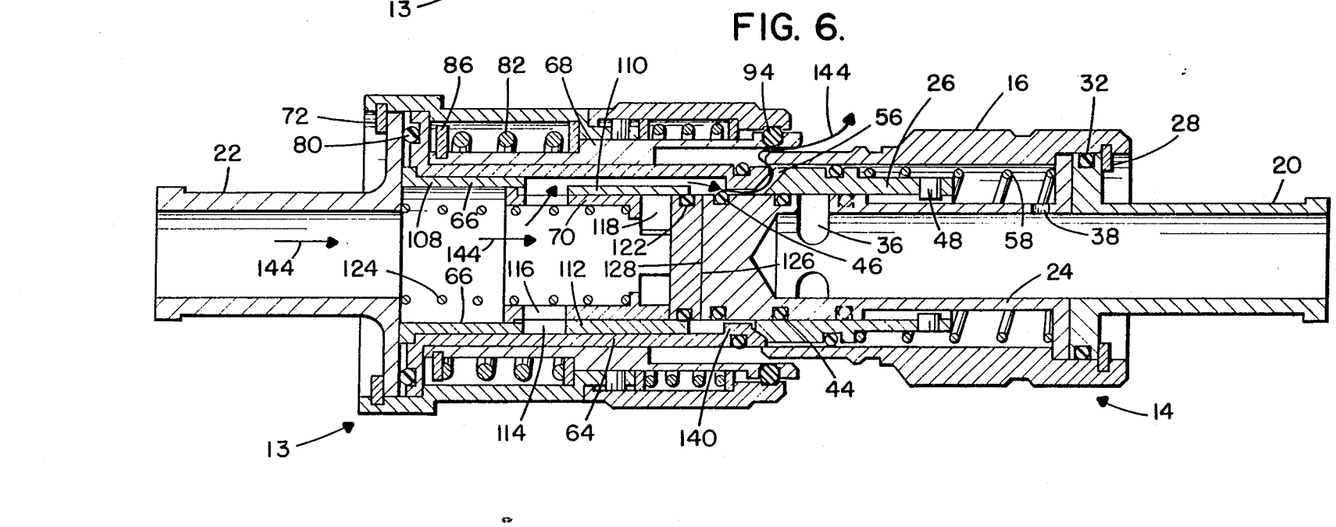

FIG. 6 shows the configuration of the connector at the beginning of the second and final purge of the connector. Shuttle valve 26 has moved downstream relative to inner housing 24, but is still in a sealed relationship to that housing.

O-ring 46 has finished riding over portion 140 of inner housing 64 and has just released from this portion. The riding of O-ring 46 over portion 140 has helped clean contamination from this element.

Shuttle valve 70 has moved upstream so that apertures 116 are in alignment with ports 114 of liner 66. In this way, purging fluid 144 can pass through the bore of rearward cylindrical section 108 of liner 66, through a portion of the bore of shuttle valve 70, through apertures 116, through ports 114, between forward cylindrical section 110 of liner 66 and inner housing 64, between body portion 140 and inner housing 24, and out of the connector through purge channel 56. This purging fluid further cleans the non-mating portions of surfaces 126 through 132 and also carries out of the connector any contamination which may have been released from the mating portions of these surfaces.

Figure 7:
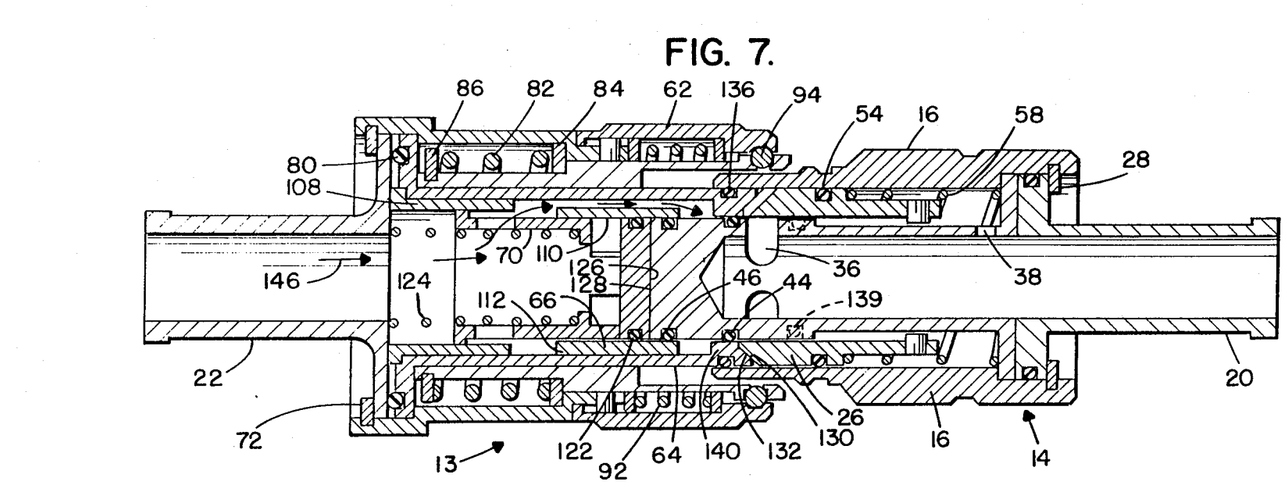

FIG. 7 shows the configuration of the connector at the end of the second purge. O-ring 44 is no longer in engagement with shuttle valve 26, but is now in engagement with body portion 140 of inner housing 64. This engagement with portion 140 stops the flow of purging fluid 146. O-ring 136 is now in engagement with outer housing 16 of subassembly 14. Accordingly, at this stage, the connector is sealed relative to the surrounding environment, although no fluid is flowing through the connector due to the seal between O-ring 44 and inner housing 64.

FIG. 8 shows the fully assembled connector. Retracting sleeve 62 has been released by the user, and spring 92 has moved this sleeve to its downstream position. Subassemblies 13 and 14 are thus latched together, since balls 94 cannot pass over protruding ring 100 with the retracting sleeve in this position.

Subassembly 14 is at its full upstream position so that ports 36 of inner housing 24 are in alignment with annular space 150 between the downstream end of forward cylindrical section 110 and the upstream end of body portion 140. Shuttle valve 26 is at its full downstream position.

Shuttle valve 70 is in its full upstream position. In this position, ports 118 of shuttle valve 70 are in alignment with ports 114 of liner 66. Accordingly, fluid can pass through the connector by passing through the bore of shuttle valve 70, through ports 118, through ports 114, around the outside of forward cylindrical section 110 of liner 66, through ports 36, through the bore of inner housing 24, and out of the connector through hose end 20. Accordingly, in the fully assembled connector, there is a high volume, low resistance fluid flow path through the connector.

As shown in FIG. 8, contaminated surfaces 126 and 128 are fully isolated in the assembled connector through the engagement of O-rings 46 and 122 with the inner wall of forward cylindrical section 110 of liner 66, as well as through the mating of the face portions of these surfaces against one another. The contamination on surfaces 126 and 128 is thus fully controlled throughout the assembly process so that the probability of this contamination entering the flowing fluid stream is extremely small, even though these surfaces lie within the envelope of the stream. The contamination on surfaces 130 and 132 is also fully controlled, in this case by physical mating of the surfaces and by the fact that the surfaces are located outside of the envelope of the fluid stream.

Thus, in the assembled connector, all contamination which could effect the flowing fluid is controlled. Experiments with the connector have shown that essentially no contamination is introduced into the fluid stream. Specifically, subassembly 13 was connected to a source of air at a pressure of about 2-3 psi, was submerged in an oil bath, and was connected to subassembly 14 while submerged. When the connector was removed from the bath and disassembled, the only components in the fluid stream on which oil was found were O-rings 46 and 122.

The assembled connector of FIG. 8 is uncoupled by moving retracting sleeve 62 to its upstream position. Subassemblies 13 and 14 are thereby free to move away from one another through the action of springs 58 and 124. In this process, the steps of FIGS. 4 through 7 are repeated in reverse order.

Thus, fluid flow through the connector ceases during the transition between the FIG. 8 and FIG. 7 configurations; sealing of subassembly 14 takes place during the transition from FIG. 7 to FIG. 6 as O-ring 44 engages shuttle valve 26; purging also takes place during this transition: purging temporarily ceases and then resumes during the transition from FIG. 6 to FIG. 5; finally, purging ceases, subassembly 13 seals, and mating surfaces 126 through 132 are moved apart as the connector goes from the FIG. 5 configuration to the fully uncoupled configuration of FIG. 4.

The uncoupling process, since it uses the same steps as the coupling process, prevents contamination from entering the sealed portions of subassemblies 13 and 14. Springs 58 and 124 are selected so that shuttle valves 26 and 70 retrace their steps as the connector is uncoupled. Accordingly, after uncoupling, connector 10 is ready for reuse without the need for any cleaning of the subassemblies by the user.

The components of connector 10 can be made from various materials, e.g., plastics and/or metals, known in the art. For example, the acetal resin sold under the DELRIN trademark has been found to be suitable for constructing the various housings and similar parts used in connector 10.

Although specific embodiments of the invention have been described and illustrated, it is to be understood that modifications can be made without departing from the invention's spirit and scope. For example, the components shown can be arranged in a variety of configurations. Similarly, the connector can be constructed from components other than those illustrated.

What is claimed is:

1. A method for coupling the end of a first conduit to the end of a second conduit comprising the steps of:
   (a) providing the end of the first conduit with a first coupler;
   (b) providing the end of the second conduit with a second coupler, said first and second couplers being engageable with one another to produce a fluid path between the two conduits, said fluid path defining an outer envelope;
   (c) engaging the first and second couplers to form the fluid path; and
   (d) isolating from the fluid path all surfaces of the couplers which (i) are exposed to the environment when the couplers are out of engagement with each other, and (ii) are within the outer envelope of the fluid path when the couplers are engaged.

2. The method of claim 1 wherein the surfaces are isolated between O-rings.

3. The method of claim 1 wherein portions of the surfaces are brought into engagement as the couplers are engaged.

4. The method of claim 1 wherein fluid is passed over a portion of the surfaces as the couplers are engaged.

5. The method of claim 1 wherein (i) the direction of fluid flow is from the first conduit to the second conduit, (ii) the second coupler is sealed when not in engagement with the first coupler, and (iii) the engagement of the first and second couplers opens the second coupler only after the surfaces have been isolated.

6. A connector for carrying a fluid comprising a first subassembly and a second subassembly, said connector having an uncoupled state in which the subassemblies are disconnected from one another and a coupled state in which the subassemblies are connected to one another so as to form (a) an internal volume which is sealed from the surrounding environment and (b) a fluid path through the connector, said fluid path having an outer envelope, said first and second subassemblies each including at least one contaminable surface which (a) is exposed to the surrounding environment when the connector is in its uncoupled state and (b) lies within both the internal volume of the connector and the outer envelope of the fluid path when the connector is in its coupled state, said connector including means for isolating all of said contaminable surfaces from the fluid path when the connector is in its coupled state.

7. The connector of claim 4 wherein the connector includes an internal wall and the means for isolating includes a pair of O-rings, and wherein the contaminable surfaces lie between the O-rings and the O-rings engage the internal wall when the connector is in its coupled state.

8. The connector of claim 6 wherein a portion of the first subassembly's at least one contaminable surface is in physical contact with a portion of the second subassembly's at least one contaminable surface when the connector is in its coupled state.

9. The connector of claim 6 including means for passing fluid over a portion of at least one of the contaminable surfaces and out of the connector as the subassemblies are coupled together.

10. The connector of claim 6 wherein the first subassembly has a sealed state in which fluid cannot pass through the subassembly and an unsealed state in which fluid can pass through the subassembly, said subassembly being in its sealed state when the connector is in its uncoupled state and being in its unsealed state when the connector is in its coupled state, and wherein the connector includes means for transferring the first subassembly from its sealed to its unsealed state as the first and second subassemblies are coupled together.

11. The connector of claim 6 wherein the second subassembly has a sealed state in which fluid cannot pass through the subassembly and an unsealed state in which fluid can pass through the subassembly, said subassembly being in its sealed state when the connector is in its uncoupled state and being in its unsealed state when the connector is in its coupled state, and wherein the connector includes means for transferring the second subassembly from its sealed to its unsealed state as the first and second subassemblies are coupled together, said transferring to the unsealed state occurring after the means for isolating has isolated the contaminable surfaces from the fluid path.

12. The connector of claim 6 wherein said first and second subassemblies each include an additional contaminable surface which (a) is exposed to the surrounding environment when the connector is in its uncoupled state and (b) lies outside the outer envelope of the fluid path but within the internal volume of the connector when the connector is in its coupled state, a portion of the first subassembly's additional contaminable surface being in physical contact with a portion of the second subassembly's additional contaminable surface when the connector is in its coupled state.

13. The connector of claim 12 including means for passing fluid over a portion of at least one of the additional contaminable surfaces and out of the connector as the subassemblies are coupled together.

14. The connector of claim 12 wherein:
(a) the connector includes an internal wall;
(b) the means for isolating includes a pair of O-rings;
(c) the contaminable surfaces lie between the O-rings and the O-rings engage the internal wall when the connector is in its coupled state; and
(d) at least one of the O-rings rides over a portion of at least one of the additional contaminable surfaces to at least partially clean that portion as the subassemblies are coupled together.

15. The connector of claim 6 wherein:
(a) the first subassembly has a sealed state in which fluid cannot pass through the subassembly and an unsealed state in which fluid can pass through the subassembly, said subassembly being in its sealed state when the connector is in its uncoupled state and being in its unsealed state when the connector is in its coupled state, and wherein the connector includes means for transferring the first subassembly from its sealed to its unsealed state as the first and second subassemblies are coupled together; and
(b) the second subassembly has a sealed state in which fluid cannot pass through the subassembly and an unsealed state in which fluid can pass through the subassembly, said subassembly being in its sealed state when the connector is in its uncoupled state and being in its unsealed state when the connector is in its coupled state, and wherein the connector includes means for transferring the second subassembly from its sealed to its unsealed state as the first and second subassemblies are coupled together, said transferring to the unsealed state occurring after the means for isolating has isolated the contaminable surfaces from the fluid path.

16. The connector of claim 15 wherein:
(a) a portion of the first subassembly's at least one contaminable surface is in physical contact with a portion of the second subassembly's at least one contaminable surface when the connector is in its coupled state; and
(b) the connector includes means for passing fluid over a portion of at least one of the contaminable surfaces and out of the connector as the subassemblies are coupled together.

17. The connector of claim 16 wherein said first and second subassemblies each include an additional contaminable surface which (a) is exposed to the surrounding environment when the connector is in its uncoupled state and (b) lies outside the outer envelope of the fluid path but within the internal volume of the connector when the connector is in its coupled state, a portion of the first subassembly's additional contaminable surface being in physical contact with a portion of the second subassembly's additional contaminable surface when the connector is in its coupled state.

18. The connector of claim 17 including means for passing fluid over a portion of at least one of the additional contaminable surfaces and out of the connector as the subassemblies are coupled together.

19. The connector of claim 18 wherein the connector includes an internal wall and the means for isolating includes a pair of O-rings, and wherein the contaminable surfaces lie between the O-rings and the O-rings engage the internal wall when the connector is in its coupled state.

20. The connector of claim 19 wherein at least one of the O-rings rides over a portion of at least one of the additional contaminable surfaces to at least partially clean that portion as the subassemblies are coupled together.

21. A connector for carrying a flowing fluid comprising a first coupler and a second coupler, said connector having an uncoupled state in which the couplers are disconnected from one another and a coupled state in which the couplers are connected to one another;

said first coupler including a housing and a shuttle valve, the shuttle valve being moveable within the housing, the housing having a contaminable first annular surface which is exposed to the environment when the connector is uncoupled, the shuttle valve carrying a first O-ring and having a contaminable first disk-shaped surface which is exposed to the environment when the connector is uncoupled;

said second coupler including a housing and a shuttle valve, the shuttle valve being moveable about the housing, the shuttle valve having a contaminable second annular surface which is exposed to the environment when the connector is uncoupled, the housing carrying a second O-ring and having a contaminable second disk-shaped surface which is exposed to the environment when the connector is uncoupled;

the first and second annular surfaces being in engagement, the first and second disc-shaped surfaces being in engagement, the disc-shaped surfaces being located between the first and second O-rings, and the first and second O-rings being in engagement with the housing of the first coupler when the connector is in its coupled state.

* * * * *